United States Patent [19]
Lee

[11] Patent Number: 5,424,967
[45] Date of Patent: Jun. 13, 1995

[54] SHIFT AND ROUNDING CIRCUIT AND METHOD

[75] Inventor: Ruby B. Lee, Los Altos Hills, Calif.

[73] Assignee: Hewlett-Packard Company, Palo Alto, Calif.

[21] Appl. No.: 158,640

[22] Filed: Nov. 29, 1993

[51] Int. Cl.⁶ .......................... G06F 7/00; G06F 7/38
[52] U.S. Cl. .................................. 364/745; 364/715.08
[58] Field of Search ............... 364/715.01, 715.08, 364/715.03, 715.04, 715.05, 745

[56] References Cited

U.S. PATENT DOCUMENTS

| | | | |
|---|---|---|---|
| 4,829,460 | 5/1989 | Ito | 364/715.08 |
| 4,890,251 | 12/1989 | Nitta et al. | 364/715.08 |
| 4,901,263 | 2/1990 | Ho et al. | 364/715.08 |
| 4,999,796 | 3/1991 | DeWitt et al. | 364/715.08 |

*Primary Examiner*—Roy N. Envall, Jr.
*Assistant Examiner*—Chuong D. Ngo

[57] ABSTRACT

A circuit for shifting the bits of an X word to obtain a Y word which is rounded to the nearest odd integer if any bit having the value 1 was shifted off of the word during the shifting operation. The circuit avoids biasing in the integer rounding operation. The shifting operations are accomplished with the aid of multiplexing circuits. The rounding operation is accomplished with the aid of multiplexing circuits that connect the least significant bit of Y to ($X_0$ OR $X_1$ OR ... $X_m$), where m is the number of places by which X is shifted.

6 Claims, 1 Drawing Sheet

SHIFT AND ROUNDING CIRCUIT AND METHOD

FIELD OF THE INVENTION

The present invention relates to computers, and more particularly, to arithmetic units for use therein.

BACKGROUND OF THE INVENTION

Many computations performed on digital computers involve division of an integer by a power of two. For example, image compression computations utilizing the Haar transform require the computation of the sum and differences of adjacent pixel values divided by two. Similarly, multiplication by a binary fraction can be decomposed into a plurality of addition operations in which one operand is generated from the division of an integer by a power of two and the subsequent addition of the result to a second integer.

The fastest method for performing a division of an integer by $2^m$ is to shift the integer to the right by m places. Such shifts can be carried out in a single instruction cycle. Hence, this procedure has significant advantages. Unfortunately, the result obtained by this method is always rounded downward with the bits shifted out being discarded. This will be referred to as truncation rounding in the following discussion. While such downward rounding may be acceptable in many circumstances, there are a number of cases in which it is undesirable. For example, if a sequence of computations are to be performed in which each computation depends on the result of a previous computation, the round off error will be larger if all of the computations utilized truncation rounding.

In addition, it is often important to maintain certain statistical properties when operating on a large set of values. Consider the case in which an image is to be reduced in size by averaging adjacent pixels in the image. That is, each group of 4 pixels is to be replaced by one pixel having a value equal to the average of the 4 pixels replaced. The image is represented by an I×I pixel array. The pixel reduction can be accomplished by averaging the odd and even rows in the array to generate an I×I/2 pixel array. The odd and even columns of this intermediate array are then averaged to generate the final (I/2)×(I/2) array. If the various averaging operations always round down as with truncation rounding, the final image will have different statistical properties than the original image. For example, the reduced image will have a lower average light intensity than the original array. It is often important that this type of artifact be avoided.

Broadly, it is the object of the present invention to provide an improved method and apparatus for rounding the result of an integer division by a power of two.

It is a further object of the present invention to provide an apparatus and method for dividing an integer by a power of two without biasing the result.

These and other objects of the present invention will become apparent to those skilled in the art from the following detailed description of the invention and the accompanying drawings.

SUMMARY OF THE INVENTION

The present invention is an apparatus for shifting the bits of an X word, having bits $X_i$, for i=0 to (N−1), by m places where m is a non-negative integer and $m \leq \mu \leq N-1$, to obtain a Y word having bits $Y_i$, for i=0 to (N−1). The apparatus includes a plurality of input terminals, each input terminal receiving one of the bits $X_i$, there being one input terminal corresponding to each $X_i$, for i=0 to (N−1). Similarly, the apparatus includes a plurality of output terminals, there being one output terminal corresponding to each $Y_i$, for i=0 to (N−1). The shifting operation is accomplished with the aid of a plurality of multiplexing circuits. Each multiplexing circuit is connected to one of the output terminals. The multiplexing circuit connected to the output terminal corresponding to $Y_i$ connects the output terminal corresponding to $Y_i$ to the input terminal corresponding to $X_{i+m}$, for i=1 to (N−1−m). The multiplexing circuit connected to $Y_0$ connects $Y_0$ to a signal having the value ($X_0$ OR $X_1$ OR ... $X_m$). The multiplexing circuit connected to the output terminal corresponding to $Y_p$ where $(p+m)>(N-1)$, connects the output terminal corresponding to $Y_p$ to logical 0 if X is an unsigned integer. The multiplexing circuit connected to the output terminal corresponding to $Y_p$, where $(p+m) \geq (N-1)$, connects the output terminal corresponding to $Y_p$ to the input terminal corresponding to $X_{N-1}$ if X is a signed integer.

DETAILED DESCRIPTION OF THE INVENTION

Figure 1:
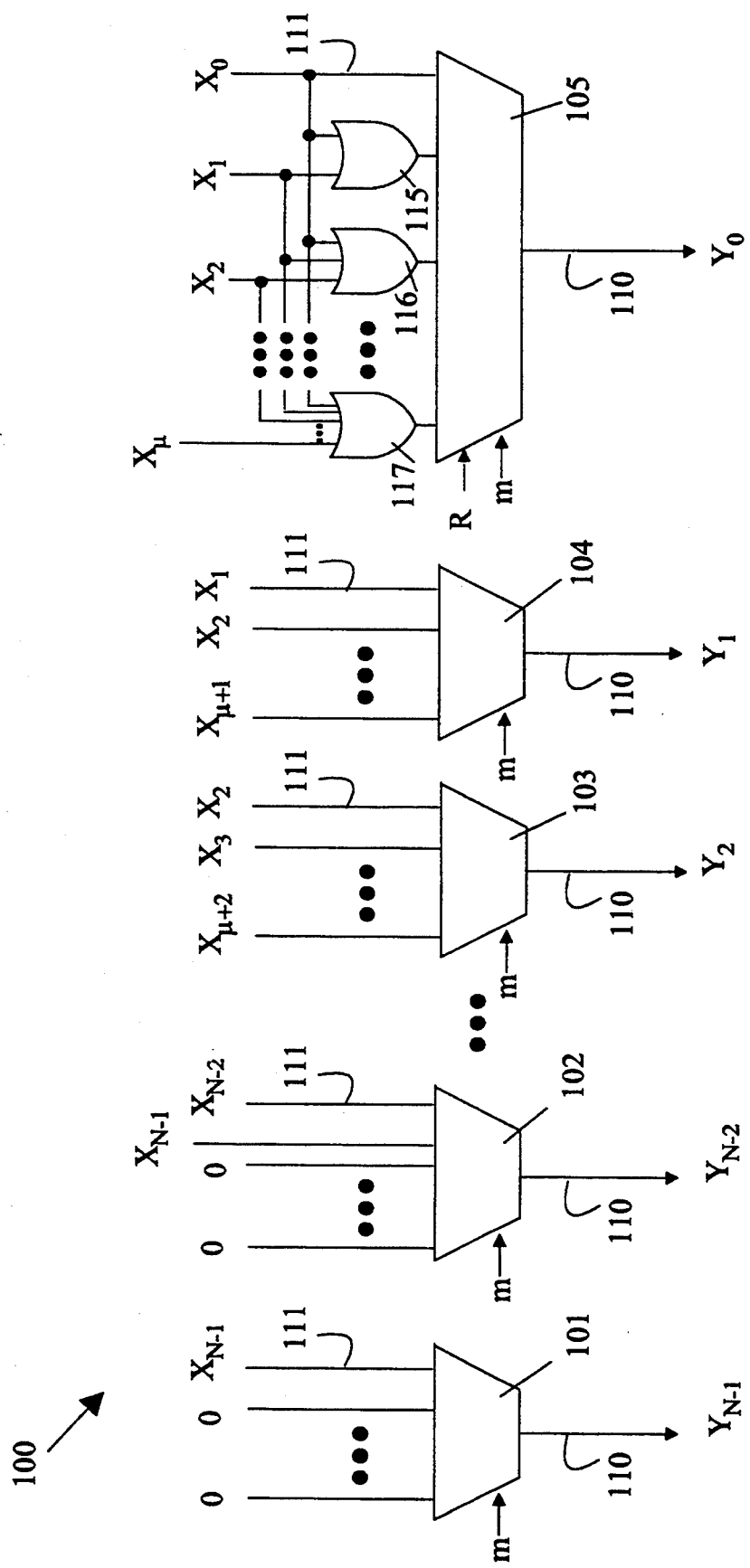
FIG. 1 is a block diagram of a shift and round circuit according to the present invention.

As noted above, division of X by $2^m$ is equivalent to right shift of X by m if X is an integer represented in binary notation. If any bit having a value of "1" is shifted off the word, then a round off error is said to occur. There are two possible rounding methods that lead to an unbiased result, these are referred to as round odd and round even. In a round even system, the result is rounded to the nearest even integer if a round off error occurred. In a round odd system, the result is rounded to the nearest odd integer if a round off error occurred. In floating point hardware, some form of round even is commonly employed because they lead to a smaller accumulated error in certain types of computations.

Refer now to FIG. 1 which is a block diagram of an embodiment of a shift and round circuit 100 according to the present invention. The present invention utilizes a round odd system because the hardware required to implement such a system is particularly simple in the case of an integer divide. Consider the result Y of dividing an integer X by $2^m$. It will be assumed that X has bits, $X_i$, for i=0 to (N−1), $X_0$ being the least significant bit of X. X will typically be held in some register and its bits will be presented to the present invention on input lines 111. Each of the input lines is labeled with the bit to which it connects. Y is represented by the bit signals on a set of output lines 110. The shifting operation is accomplished with the aid of multiplexing circuits that route $X_i$ to $Y_{i-m}$ for i=m to (N−1). Exemplary multiplexing circuits are shown at 101-104. In general, the multiplexing circuits are $(\mu+1)$-to-1 multiplexers, where $\mu$ is the maximum allowable value of m. The maximum possible value of $\mu$ is N−1. Each multiplexer connects the input line on the $m^{th}$ multiplexer input line to an output line 110 in response to a digital signal m.

The multiplexers connected to the most significant bits of Y will have a number of inputs for which there are no corresponding X bits. These inputs are connected to logical 0 in the embodiment shown in FIG. 1; however, it will be apparent to those skilled in the art that these multiplexers could be replaced by multiplexers having smaller numbers of inputs with the input connected to logical 0 being connected to the output line whenever an input line greater than N−1 was selected. However, to simplify the following discussion, it will be assumed that each multiplexer is a ($\mu$+1)-to-1 multiplexer. If shift and round circuit 100 is operating on unsigned integers, the multiplexers select the inputs connected to logical 0 if the corresponding X bit would have been greater than N−1. If (p+m)>(N−1) then the multiplexer connected to $Y_p$ will connect $Y_p$ to logical 0.

If circuit 100 is operating on signed integers, the multiplexers connected to the most significant bits of Y connect Y to $X_{N-1}$ to preserve the sign bit. Hence, if (p+m)≧(N−1), the multiplexer connected to $Y_p$ connects $Y_p$ to the input line having $X_{N-1}$ connected thereto. There will always be one such input line on the multiplexers for which this is true.

Multiplexer 105 connected to $Y_0$ implements the round odd system utilized in one embodiment of the present invention. Multiplexer 105 responds to a round signal R and the shift signal m specifying the number of places X is to be shifted. To implement round odd in response to a rounding signal R, multiplexer 105 replaces the least significant bit of Y by ($X_0$ OR $X_1$ OR . . $X_m$) by selecting the $m^{th}$ input to multiplexer 105. The $m^{th}$ input to multiplexer 105 is connected to an OR circuit having inputs of $X_0$ through $X_m$. Exemplary OR circuits are shown at 115-117. If any of the bits shifted off of X is a "1", then a round off error occurred. In this case, the least significant bit of Y will be forced to be a "1". That is, the result will be rounded to the nearest odd integer. If no round off error occurred, the least significant bit of Y will be $X_m$.

It can be shown that the average error obtained with this form of rounding is zero provided the least significant (m+1) bits of the X values are uniformly distributed. It should be noted that a round even system also prevents biasing in rounding. However, the hardware needed to implement a round even scheme is significantly more complex than that described above; hence, round odd systems are preferred.

While the present invention has been described in terms of its usefulness in situations involving division by $2^m$ of an integer, it will be apparent to those skilled in the art that the present invention may also be useful in operations on fixed point numbers as well as integers.

Various modifications to the present invention will become apparent to those skilled in the art from the foregoing description and accompanying drawings. Accordingly, the present invention is to be limited solely by the scope of the following claims.

What is claimed is:

1. An apparatus for shifting the bits of an X word having bits $X_i$, for i=0 to (N−1), by m places where m is a non-negative integer less than N, to obtain a Y word having bits $Y_i$, for i=0 to (N−1), said apparatus comprising:

a plurality of signal input terminals, each said input terminal receiving one of said bits $X_i$, there being one said input terminal corresponding to each $X_i$, for i=0 to (N−1);

a plurality of signal output terminals, there being one said output terminal corresponding to each $Y_i$, for i=0 to (N−1);

a plurality of multiplexing circuits, each said multiplexing circuit comprising a plurality of input terminals and an output terminal, at least one of said input terminals of said multiplexing circuit being connected to one of said signal input terminals, each said multiplexing circuit having said output terminal thereof connected to one said signal output terminals, said multiplexing circuit connected to said signal output terminal corresponding to $Y_i$ connecting said signal output terminal corresponding to $Y_i$ to said signal input terminal corresponding to $X_{i+m}$, for i=1 to (N−1−m); and a multiplexing circuit having a plurality of input terminals and an output terminal, said output terminal being connected to $Y_0$ and one of said input terminals thereof connected to a circuit for generating a signal having the value ($X_0$ OR $X_1$ OR . . . $X_m$).

2. The apparatus of claim 1 wherein said multiplexing circuit connected to said signal output terminal corresponding to $Y_p$ where (p+m)>(N−1), connects said signal output terminal corresponding to $Y_p$ to logical 0 if X is an unsigned integer.

3. The apparatus of claim 1 wherein said multiplexing circuit connected to said signal output terminal corresponding to $Y_p$, where (p+m)≧(N−1), connects said signal output terminal corresponding to $Y_p$ to said signal input terminal corresponding to $X_{N-1}$ if X is a signed integer.

4. A method for shifting the bits of an X word having bits $X_i$, for i=0 to (N−1), by m places where m is a non-negative integer less than N, to obtain a Y word having bits $Y_i$, for i=0 to (N−1), said method comprising the steps of providing a plurality of input terminals, each said input terminal receiving one of said bits $X_i$, there being one said input terminal corresponding to each $X_i$, for i=0 to (N−1);

providing a plurality of output terminals, there being one said output terminal corresponding to each $Y_i$, for i=0 to (N−1);

connecting said output terminal corresponding to $Y_i$ to said input terminal corresponding to $X_{i+m}$, for i=1 to (N−1−m) utilizing one or more multiplexing circuits; and generating a signal having the value ($X_0$ OR $X_1$ OR . . . $X_m$) and connecting said signal to $Y_0$ utilizing a multiplexing circuit.

5. The method of claim 4 further comprising the step of connecting said output terminal corresponding to $Y_p$ where (p+m)>(N−1), to logical 0 if X is an unsigned integer.

6. The method of claim 4 further comprising the step of connecting said output terminal corresponding to $Y_p$, where (p+m)≧(N−1), to said input terminal corresponding to $X_{N-1}$ if X is a signed integer.

* * * * *